(12) United States Patent  
Galati et al.

(10) Patent No.: US 10,052,801 B2
(45) Date of Patent: Aug. 21, 2018

(54) END OF STROKE ACTUATOR BLEED (71) Applicant: Synventive Molding Solutions, Inc., Peabody, MA (US)

(72) Inventors: Vito Galati, Rowley, MA (US); Zhuang Rui Tan, Evanston, IL (US)

(73) Assignee: Synventive Molding Solutions, Inc., Peabody, MA (US)

( * ) Notice: Subject to any disclaimer, the term of this patent is extended or adjusted under 35 U.S.C. 154(b) by 127 days.

(21) Appl. No.: 14/933,073

(22) Filed: Nov. 5, 2015

(65) Prior Publication Data

US 2016/0052184 A1    Feb. 25, 2016

Related U.S. Application Data (63) Continuation of application No. PCT/US2014/039562, filed on May 27, 2014.

(Continued)

(51) Int. Cl.
*B29C 45/28* (2006.01)
*F15B 21/04* (2006.01)

(Continued)

(52) U.S. Cl.
CPC .......... *B29C 45/281* (2013.01); *F15B 15/149* (2013.01); *F15B 21/044* (2013.01); *F16K 31/122* (2013.01)

(58) Field of Classification Search
CPC .................................. B29C 45/281

(Continued)

(56) References Cited

U.S. PATENT DOCUMENTS

| 4,767,255 A * | 8/1988 | Mickelson | E02F 3/32 |
| | | | 414/695.5 |
| 6,419,870 B1 | 7/2002 | Lee et al. | |
| 2004/0056225 A1* | 3/2004 | Novo | B29C 45/281 |
| | | | 251/63.6 |

FOREIGN PATENT DOCUMENTS

| CH | 638 021 A5 | 8/1983 |
| EP | 0269091 A2 | 1/1988 |
| JP | 2005-133902 A | 5/2005 |

OTHER PUBLICATIONS

Int'l. Search Report and Written Opinion dated Sep. 8, 2014 in Int'l. Appln. No. PCT/US2014/039562.

* cited by examiner

*Primary Examiner* — Jill L Heitbrink
(74) *Attorney, Agent, or Firm* — Polsinelli PC; M. Lawrence Oliverio; Therese A. Hendricks (57) ABSTRACT

An apparatus for driving a valve pin in an injection molding system, comprising:
an actuator having a piston disposed within a master chamber, the piston being slidable upstream and downstream within the master chamber having a seal that forms a seal surface with a complementary interior surface of the master chamber, the seal surface forming opposing upstream and downstream fluid drive chambers,
a bleed port extending through the interior surface of the master chamber at a position on the interior surface of the master chamber where the bleed port is:
either disposed immediately downstream of the complementary interior surface of the master chamber that forms a seal with the seal surface of the piston and communicates with a downstream fluid drive chamber when the piston is in a fully upstream position, or (Continued)

is disposed immediately upstream of the complementary interior surface of the master chamber that forms a seal with the circumferential seal surface of the piston and communicates with an upstream fluid drive chamber when the piston is in a fully downstream position.

18 Claims, 9 Drawing Sheets

Related U.S. Application Data (60) Provisional application No. 61/827,897, filed on May 28, 2013, provisional application No. 61/828,454, filed on May 29, 2013.

(51) Int. Cl.
*F15B 15/14* (2006.01)
*F16K 31/122* (2006.01)

(58) Field of Classification Search
USPC .......................................................... 92/163
See application file for complete search history.

END OF STROKE ACTUATOR BLEED

RELATED APPLICATIONS

This application is a continuation of and claims the benefit of priority to PCT/US2014/039562 filed May 27, 2014 which in turn claims priority to U.S. Provisional Application Ser. No. 61/827,897 filed May 28, 2013 and to U.S. Provisional Application Ser. No. 61/828,454 filed May 29, 2013, the disclosure of all of the foregoing of which are incorporated by reference as if fully set forth herein.

The disclosures of all of the following are incorporated by reference in their entirety as if fully set forth herein: U.S. Pat. No. 5,894,025, U.S. Pat. No. 6,062,840, U.S. Pat. No. 6,294,122, U.S. Pat. No. 6,309,208, U.S. Pat. No. 6,287,107, U.S. Pat. No. 6,343,921, U.S. Pat. No. 6,343,922, U.S. Pat. No. 6,254,377, U.S. Pat. No. 6,261,075, U.S. Pat. No. 6,361,300, U.S. Pat. No. 6,419,870, U.S. Pat. No. 6,464,909, U.S. Pat. No. 6,599,116, U.S. Pat. No. 7,234,929, U.S. Pat. No. 7,419,625, U.S. Pat. No. 7,569,169, U.S. patent application Ser. No. 10/214,118, filed Aug. 8, 2002, U.S. Pat. No. 7,029,268, U.S. Pat. No. 7,270,537, U.S. Pat. No. 7,597,828, U.S. patent application Ser. No. 09/699,856 filed Oct. 30, 2000, U.S. patent application Ser. No. 10/269,927 filed Oct. 11, 2002, U.S. application Ser. No. 09/503,832 filed Feb. 15, 2000, U.S. application Ser. No. 09/656,846 filed Sep. 7, 2000, U.S. application Ser. No. 10/006,504 filed Dec. 3, 2001, and U.S. application Ser. No. 10/101,278 filed Mar. 19, 2002 and U.S. application Ser. No. 13/484,336 filed May 31, 2012 and U.S. application Ser. No. 13/484,408 filed May 31, 2012.

BACKGROUND OF THE INVENTION

Figure 6:
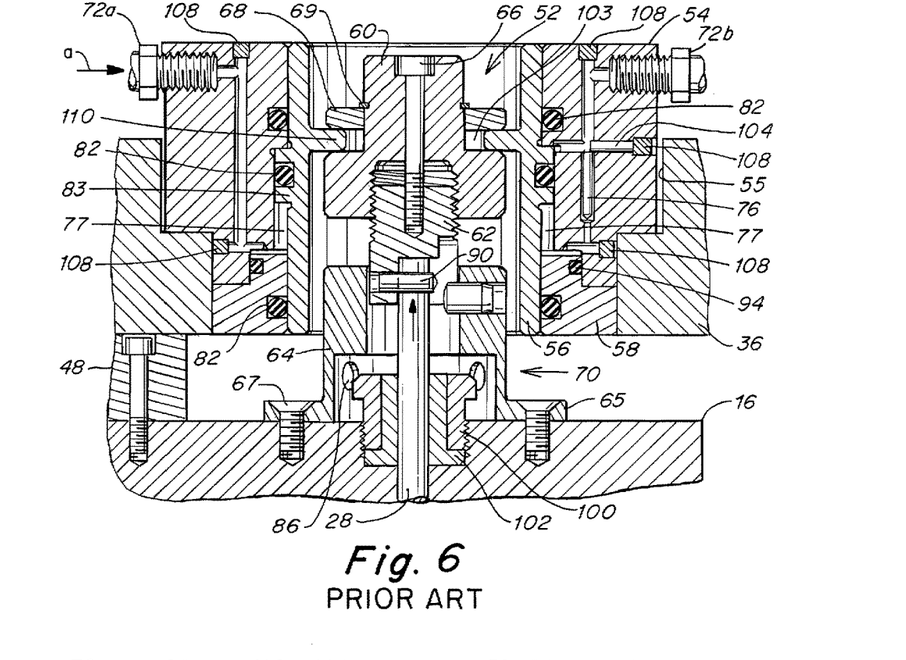
FIG. 6 is a cross-sectional view a prior art actuator showing a bleed port in communication with both the upstream and downstream fluid drive chambers when the piston is in the fully upstream position.
Figure 7:
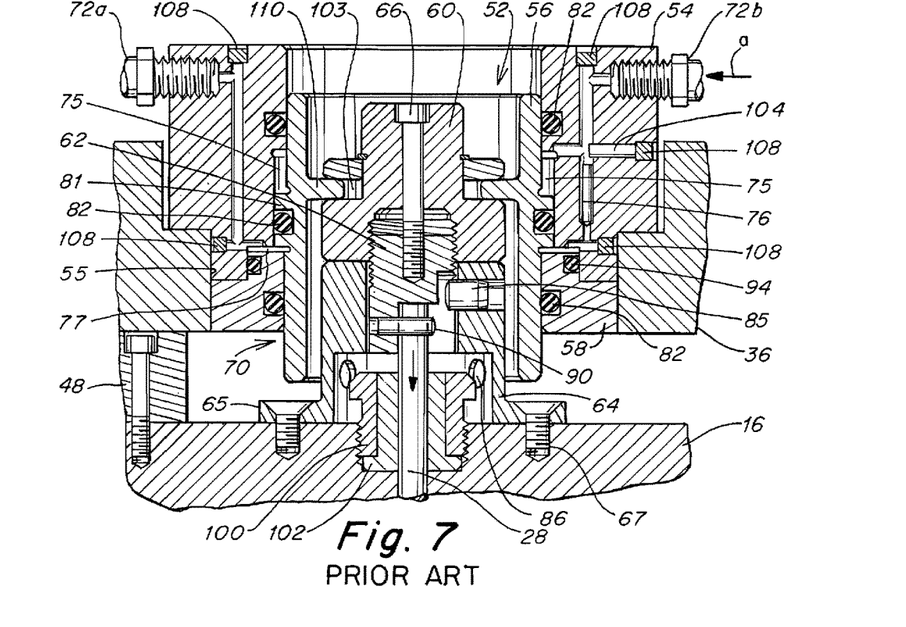
FIG. 7 is similar to the FIG. 6 showing the piston in the fully downstream position.

Injection molding systems powered by hydraulically driven actuators have been developed having drive fluid bleed mechanisms that communicate at all times during an injection cycle with both the downstream and upstream fluid drive chambers of the actuator as shown for example in FIGS. 6, 7 and described in U.S. Pat. No. 6,419,870.

SUMMARY OF THE INVENTION

In accordance with the invention there is provided an apparatus for driving a valve pin in an injection molding system, comprising:

an actuator comprised of a housing having a fluid sealed master chamber having a longitudinal axis formed within the housing having a piston disposed within the master chamber, the piston having a circumferential surface complementary to an interior surface of the master chamber, the piston being slidable upstream and downstream along an axial path of travel within the master chamber wherein a seal surface is disposed on the circumferential surface of the piston that engages against and forms a fluid seal with a selected axial length of the complementary interior surface of the master chamber, the fluid seal forming opposing upstream and downstream fluid drive chambers disposed on opposing upstream and downstream ends of the piston within the master chamber, the path of travel of the piston extending between a fully upstream position and a fully downstream position, wherein upstream and downstream fluid delivery ports are formed within the housing of the actuator, the upstream fluid delivery port communicating with the upstream fluid drive chamber and the downstream port communicating with the downstream fluid drive chamber to reciprocally deliver drive fluid under one or more preselected pressures into the upstream and downstream chambers to reciprocally drive the piston between the fully upstream and downstream positions, a bleed device comprised of a single port extending through the interior surface of the master chamber at an axial position along the longitudinal axis of the master chamber wherein the single port is:

either disposed immediately downstream of the complementary interior surface of the master chamber that forms a seal with the circumferential seal surface of the piston and communicates with the downstream fluid drive chamber when the piston is in the fully upstream position, or is disposed immediately upstream of the complementary interior surface of the master chamber that forms a seal with the circumferential seal surface of the piston and communicates with the upstream fluid drive chamber when the piston is in the fully downstream position.

The single port can extend through the housing at an axial position along the axis of the master chamber such that the single port coincides or overlaps with a downstream axial end of the seal surface when the piston is in the fully upstream position.

The apparatus can include a second bleed device having a second single port that is disposed immediately upstream or downstream of another of the complementary interior surfaces of the master chamber that forms a seal with the circumferential seal surface of the piston and communicates with another of the upstream or downstream fluid drive chamber when the piston is in another of the fully upstream or downstream positions.

The axial position of an upstream axial end of the single port is typically disposed either:

from about 0 to about 8 mm downstream of a downstream axial end of the seal surface when the piston is in the fully upstream position, or from about 0 to about 8 mm upstream of an upstream axial end of the seal surface when the piston is in the fully downstream position.

The single port is preferably formed so as to extend through the interior wall at an axial position along the path of travel of the piston wherein the single port communicates with the upstream fluid drive chamber and is sealed off from the downstream fluid drive chamber when the piston is disposed within a first selected portion of the path of travel and wherein the single port communicates with the downstream fluid drive chamber and is sealed off from the upstream fluid drive chamber when the piston is disposed within a second selected portion of the path of travel.

The single port can be adapted to enable flow in one direction.

The single port can be adapted to restrict volume of flow of drive fluid through the single port to less than about 25% of volume of flow of drive fluid through the upstream fluid delivery port at the preselected pressure.

The single port is typically disposed and extends through the interior wall of the master chamber at an axial position along the axis of the master chamber that enables the single port to either:

communicate with the downstream fluid drive chamber only when the piston is disposed from between about 0 to about 8 mm downstream from the fully upstream position of the piston along the path of travel, or communicate with the upstream fluid drive chamber only when the piston is disposed from between about 0 to about 8 mm upstream from the fully downstream position of the piston along the path of travel.

In another aspect of the invention there is provided an apparatus for driving a valve pin in an injection molding system, comprising:

an actuator comprised of a housing having a fluid sealed master chamber having a longitudinal axis and being formed within the housing, the actuator including a piston disposed within the master chamber, the piston having a circumferential surface complementary to an interior surface of the master chamber, the piston being slidable upstream and downstream along an axial path of travel within the master chamber wherein a seal surface is disposed on the circumferential surface of the piston that engages against and forms a fluid seal with a selected axial length of the complementary interior surface of the master chamber, the fluid seal forming opposing upstream and downstream fluid drive chambers disposed on opposing upstream and downstream ends of the piston within the master chamber, the path of travel of the piston extending between a fully upstream position and a fully downstream position, wherein upstream and downstream fluid delivery ports are formed within the housing of the actuator, the upstream fluid delivery port communicating with the upstream fluid drive chamber and the downstream port communicating with the downstream fluid drive chamber to reciprocally deliver drive fluid under one or more preselected pressures into the upstream and downstream chambers to reciprocally drive the piston between the fully upstream and downstream positions, a bleed device comprised of a single port formed and disposed within the housing so as to extend through the interior wall at an axial position along the path of travel of the piston wherein the single port communicates with the upstream fluid drive chamber and is sealed off from the downstream fluid drive chamber when the piston is disposed within a first selected portion of the path of travel and wherein the single port communicates with the downstream fluid drive chamber and is sealed off from the upstream fluid drive chamber when the piston is disposed within a second selected portion of the path of travel.

The single port can be formed within the housing at an axial position along the axis of the interior surface of the master chamber such that either:

an upstream axial end of the single port coincides with or overlaps with a downstream axial end of the seal surface when the piston is in the fully upstream position, or, a downstream axial end of the single port coincides with or overlaps with an upstream axial end of the seal surface when the piston is in the fully downstream position.

The axial position of the single port can be disposed either:

such that an upstream axial end of the single port is disposed from about 0 to about 8 mm downstream of a downstream axial end of the seal surface when the piston is in the fully upstream position, or such that a downstream axial end of the single port is disposed from about 0 to about 8 mm upstream of an upstream axial end of the seal surface when the piston is in the fully downstream position.

The single port is preferably disposed in and extends through the interior surface of the master chamber at an axial position along the axis of the interior surface of the master chamber that is immediately downstream of the complementary interior surface of the master chamber that forms a seal with the circumferential seal surface of the piston when the piston is in the fully upstream position.

The apparatus can include a second bleed device having a second single port that is disposed immediately upstream or downstream of another of the complementary interior surfaces of the master chamber that forms a seal with the circumferential seal surface of the piston and communicates with another of the upstream or downstream fluid drive chamber when the piston is in another of the fully upstream or downstream positions.

The single port can be adapted to enable flow in one direction.

The single port can be adapted to restrict volume of flow of drive fluid through the single port to less than about 25% of volume of flow of drive fluid through the upstream fluid delivery port at the preselected pressure.

The single port is typically disposed in the interior wall of the master chamber at an axial position along the axis of the master chamber that enables the single port to either:

communicate with the downstream fluid drive chamber only when the piston is disposed from between about 0 to about 8 mm downstream from the fully upstream position of the piston along the path of travel, or communicate with the upstream fluid drive chamber only when the piston is disposed from between about 0 to about 8 mm upstream from the fully downstream position of the piston along the path of travel.

In another aspect of the invention there is provided a method of driving an actuator comprised of a housing having a fluid sealed master chamber having a longitudinal axis, the master chamber being formed within the housing and having a piston disposed within the master chamber, the piston having a circumferential surface complementary to an interior surface of the master chamber, wherein the piston is slidable upstream and downstream along an axial path of travel within the master chamber with the circumferential surface of the piston fluid sealably engaged against and forming a seal with a selected axial length of the complementary interior surface of the master housing, the seal forming opposing upstream and downstream fluid drive chambers disposed on opposing upstream and downstream ends of the piston within the master chamber, wherein the path of travel of the piston extends between a fully upstream position and a fully downstream position, wherein upstream and downstream fluid delivery ports are formed within the housing of the actuator, the upstream fluid delivery port communicating with the upstream fluid drive chamber and the downstream port communicating with the downstream fluid drive chamber to reciprocally deliver drive fluid under one or more preselected pressures into the upstream and downstream chambers to reciprocally drive the piston between the fully upstream and downstream positions, the method comprising:

forming a bleed device having a single port within the housing such that the single port extends through the interior wall at an axial position along the path of travel, communicates with the upstream fluid drive chamber and is sealed off from the downstream fluid drive chamber when the piston travels along a first selected portion of the path of travel and wherein the single port communicates with the downstream fluid drive chamber and is sealed off from the upstream fluid drive chamber when the piston travels along a second selected portion of the path of travel.

Such a method can further comprise forming the single port within the housing at an axial position along the axis of the interior surface of the master chamber such that the axial position of an upstream axial end of the single port coincides with or overlaps with the axial position of a downstream axial end of the seal surface when the piston is in the fully upstream position.

Such a method preferably further comprises forming the single port in the housing such that the axial position of the single port is disposed either:

such that an upstream axial end of the single port is disposed from about 0 to about 8 mm downstream of a downstream axial end of the seal surface when the piston is in the fully upstream position, or such that a downstream axial end of the single port is disposed from about 0 to about 8 mm upstream of an upstream axial end of the seal surface when the piston is in the fully downstream position.

Such a method preferably further comprises disposing the single port in the interior wall of the master chamber at an axial position along the path of travel that is immediately downstream of the circumferential surface of the piston when the piston is in the fully upstream position.

Such a method can further comprise forming a second bleed device having a second single port that is disposed immediately upstream or downstream of another of the complementary interior surfaces of the master chamber that forms a seal with the circumferential seal surface of the piston and communicates with another of the upstream or downstream fluid drive chamber when the piston is in another of the fully upstream or downstream positions.

Such a method typically further comprises adapting the single port to enable flow of the drive fluid in one direction.

Such a method can further comprise adapting the single port to restrict volume of flow of drive fluid through the single port to less than about 25% of volume of flow of drive fluid through the upstream fluid delivery port at the preselected pressure.

Such a method can further comprise disposing the single port in the interior wall of the master chamber at an axial position along the path of travel that enables the single port to either:

communicate with the downstream fluid drive chamber only when the piston is disposed in the fully upstream position of the piston, or communicate with the upstream fluid drive chamber only when the piston is in the fully downstream position of the piston.

In another aspect of the invention there is provided a method of driving an actuator comprised of a housing having a fluid sealed master chamber having a longitudinal axis being formed within the housing and having a piston disposed within the master chamber, the piston having a circumferential surface complementary to an interior surface of the master chamber, wherein the piston is slidable upstream and downstream along an axial path of travel within the master chamber with the circumferential surface of the piston fluid sealably engaged against and forming a seal with a selected axial length of the complementary interior surface of the master housing, the seal forming opposing upstream and downstream fluid drive chambers disposed on opposing upstream and downstream ends of the piston within the master chamber, wherein the path of travel of the piston extends between a fully upstream position and a fully downstream position, wherein upstream and downstream fluid delivery ports are formed within the housing of the actuator, the upstream fluid delivery port communicating with the upstream fluid drive chamber and the downstream port communicating with the downstream fluid drive chamber to reciprocally deliver drive fluid under one or more preselected pressures into the upstream and downstream chambers to reciprocally drive the piston between the fully upstream and downstream positions, the method comprising:

forming a bleed device having a single port formed within the housing such that the single port is disposed in and extends through the interior wall at an axial position along the path of travel where the single port communicates with the downstream fluid drive chamber and is sealed off from the upstream fluid drive chamber when the piston travels along a first selected portion of the path of travel and wherein the single port communicates with the upstream fluid drive chamber and is sealed off from the downstream fluid drive chamber when the piston travels along a second selected portion of the path of travel.

Such a method can further comprise forming the single port within the housing at an axial position along the axis of the master chamber either:

such that the axial position of a downstream axial end of the single port coincides with or overlaps with the axial position of an upstream axial end of the seal surface when the piston is in the fully downstream position, or, such that the axial position of an upstream axial end of the single port coincides with or overlaps with the axial position of a downstream axial end of the seal surface when the piston is in the fully upstream position.

Such a method preferably further comprises forming the single port in the housing such that the axial position of either:

a downstream axial end of the single port is disposed between about 0 and about 8 mm upstream from the axial position of an upstream axial end of the seal surface when the piston is in the fully downstream position, or an upstream axial end of the single port is disposed between about 0 and about 8 mm downstream from the axial position of a downstream axial end of the seal surface when the piston is in the fully upstream position.

Such a method preferably further comprises disposing the single port in the interior wall of the master chamber at an axial position along the path of travel that is immediately upstream of the circumferential surface of the piston when the piston is in the fully downstream position.

Such a method can include forming a second bleed device having a second single port that is disposed immediately upstream or downstream of another of the complementary interior surfaces of the master chamber that forms a seal with the circumferential seal surface of the piston and communicates with another of the upstream or downstream fluid drive chamber when the piston is in another of the fully upstream or downstream positions.

Such a method typically further comprises adapting the single port to enable flow of the drive fluid in one direction.

Such a method can further comprise adapting the single port to restrict volume of flow of drive fluid through the single port to less than about 25% of volume of flow of drive fluid through the downstream fluid delivery port at the preselected pressure.

Such a method can further comprise disposing the single port in the interior wall of the master chamber at an axial position along the path of travel that enables the single port to communicate either:

with the upstream fluid drive chamber only when the piston is disposed in the fully downstream position, or, with the downstream fluid drive chamber only when the piston is disposed in the fully upstream position.

BRIEF DESCRIPTION OF THE DRAWINGS

The above and further advantages of the invention may be better understood by referring to the following description in conjunction with the accompanying drawings in which.

DETAILED DESCRIPTION

Figure 1:
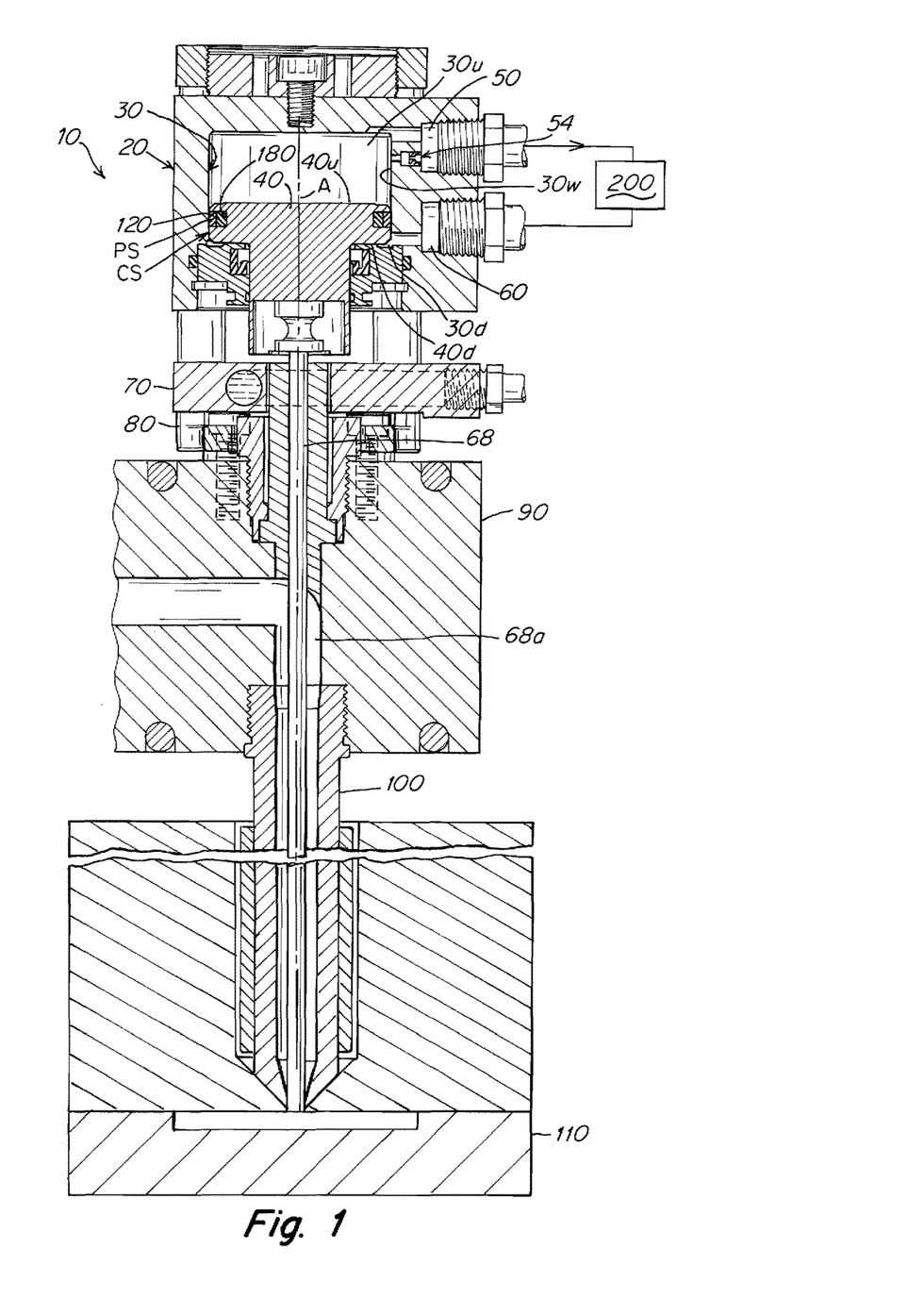
FIG. 1 is a cross-sectional view of a valve that includes an end-of-stroke actuator bleed apparatus according to the invention mounted on a cooling plate and mount which are in turn mounted on a manifold.

FIG. 1 shows an injection molding system valve 10 comprised of an actuator bleed apparatus according to the invention. The valve 10 includes an actuator comprised of a housing 20 that fluid sealably houses a master chamber 30, typically cylindrical in configuration, having and axis and cylindrical interior walls 30w that are generally complementary to the outer cylindrical circumferential surface CS of a piston 40 that is drivably slidable upstream and downstream along the axis A within the master chamber 30.

As shown, the actuator housing 20 is fixedly mounted on or to a hotrunner or molten injection fluid distribution manifold 90 having a distribution channel in fluid communication with the fluid delivery bore 68a of a nozzle 100. The actuator housing 20 is typically separated from the hotrunner 90 by a cooling plate 70 that is mounted on an intermediate mounting plate 80 that is in turn mounted on the manifold 90. A valve pin 68 is interconnected to the axially slidable piston 40.

Figure 3:
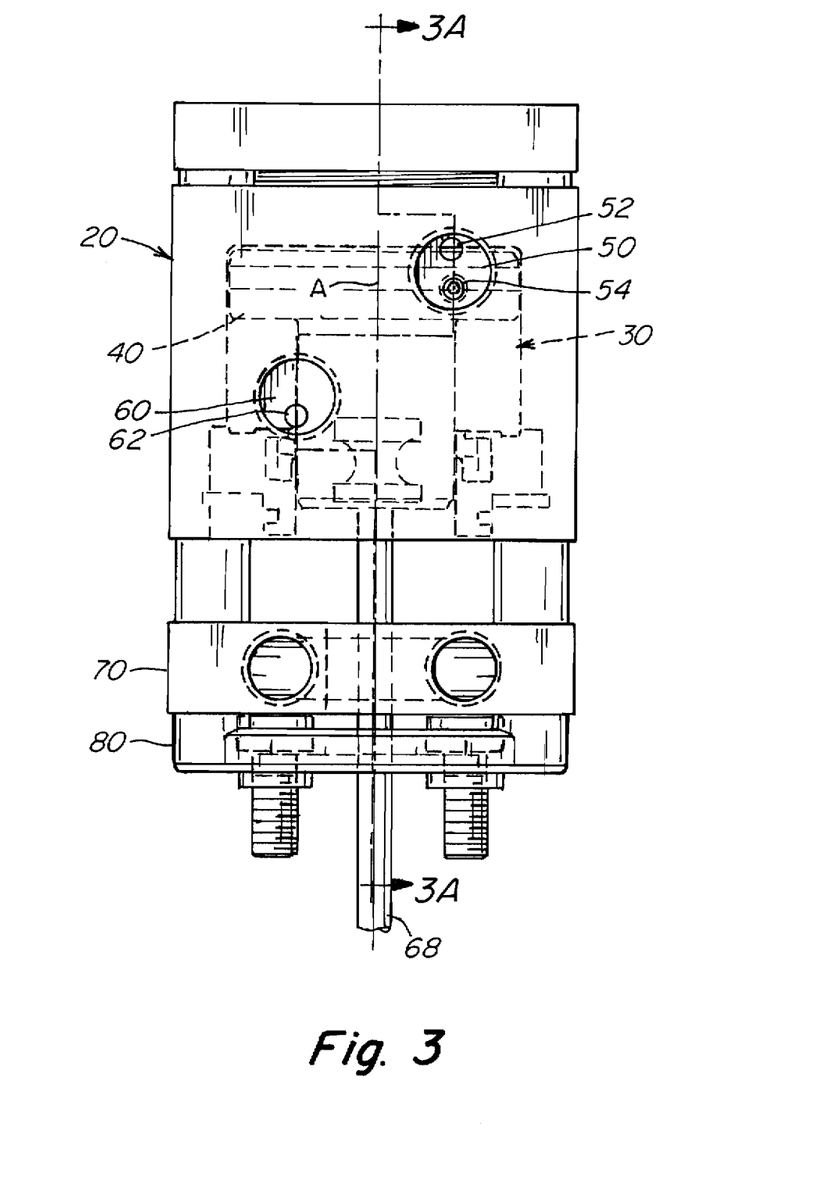
FIG. 3 is side view of an apparatus according to FIG. 1 where the piston is in the fully upstream position where the valve pin is away from and not blocking the gate to the cavity of a mold 110.
Figure 3A:
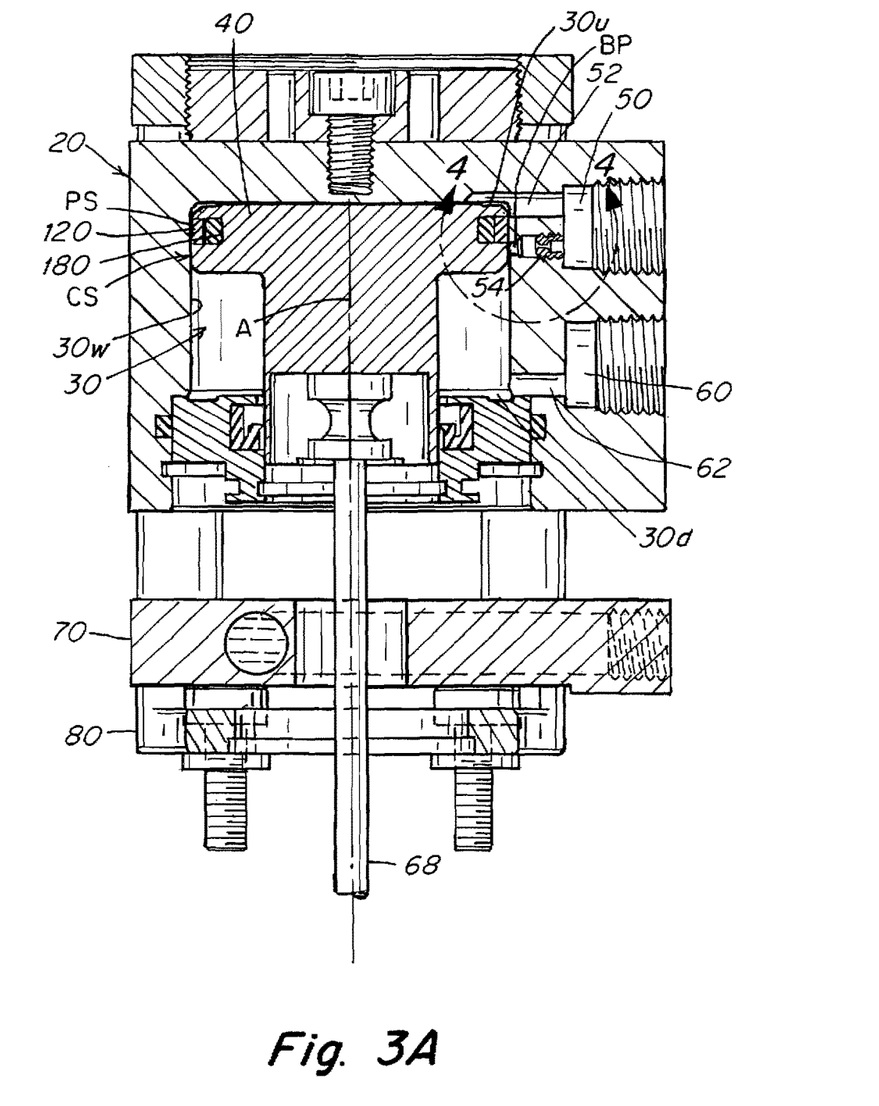
FIG. 3A is a cross-sectional view along lines 3A-3A of FIG. 3.
Figure 4:
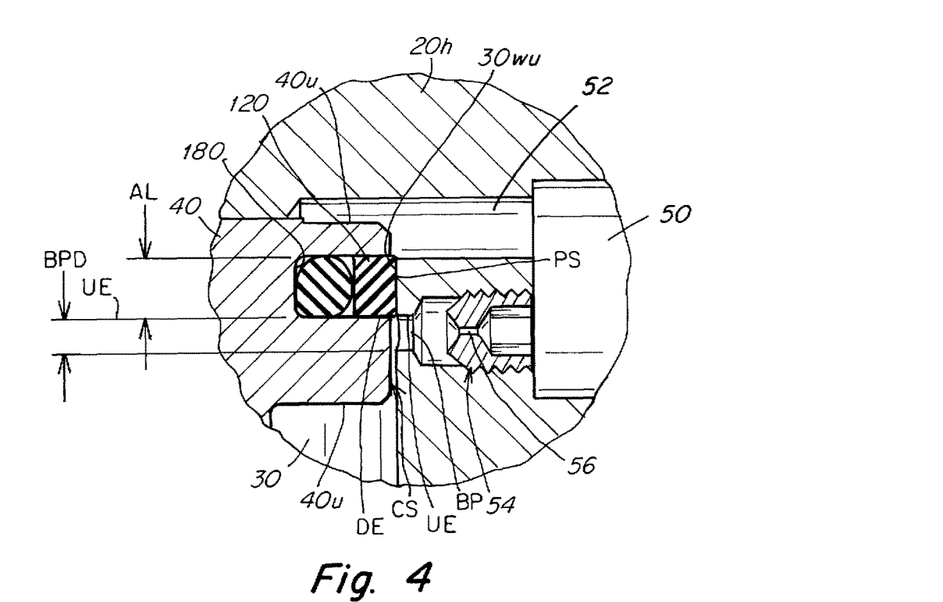
FIG. 4 is an enlarged view of the area encircled by arrows 4 in FIG. 3B.

As shown in FIGS. 1-5C, the piston 40 has an O-ring or other fluid seal mechanism 120 mounted in a circumferential groove 180, FIG. 4 that extends around the circumference of the piston 40. The O-ring or fluid seal mechanism 120 is typically comprised of a highly friction resistant polymeric material that is resiliently compressible. The O-ring or seal 120 is formed and adapted to be seated within groove 180 such that the O-Ring compressibly engages against the inner wall surface 30w of chamber 30 to form a circumferential seal surface PS that forms two opposing fluid sealed chambers 30u and 30d within master chamber 30. The upstream drive chamber 30u is interconnected to and communicates with a source of pressurized fluid 200, FIGS. 1, 5A-5C (typically hydraulic oil or gas such as air) via fluid delivery ports 50, 52 which when pumped into chamber 3u exerts a downstream force 200 on the upstream end 40u of piston 40. Similarly, piston 40 can be driven upstream by pumping pressurized hydraulic fluid 200 through ports 60, 62 into downstream chamber 30d thus exerting upstream drive force 150 on the downstream surface 40d of the piston 40.

Figure 5A:
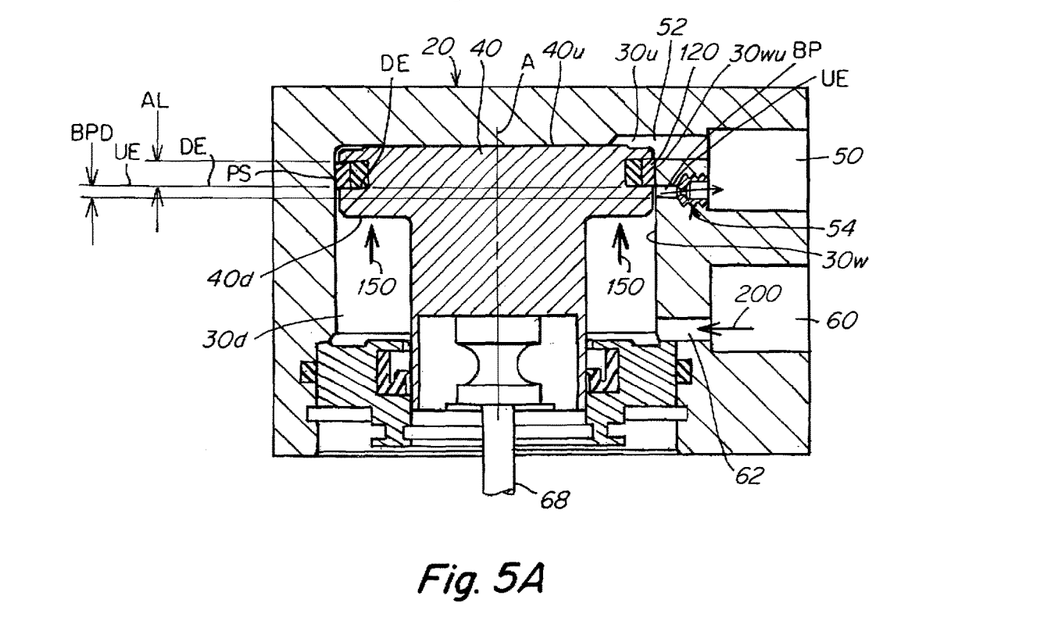
FIG. 5A is schematic sectional view of the FIG. 3 actuator with the piston in its fully upstream position showing in detail the relative size and arrangement of the seal formed between the piston and the interior wall surface of the actuator housing.
Figure 5B:
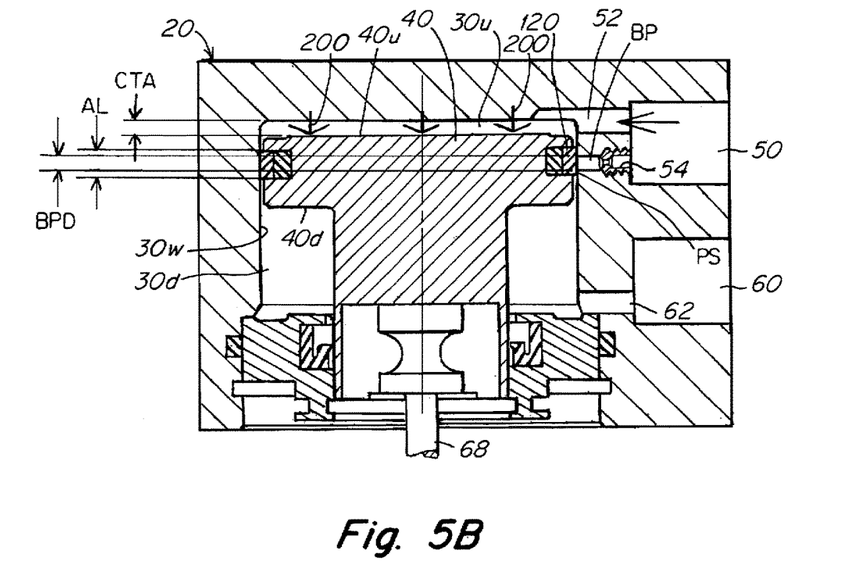
FIG. 5B is a sequential view of FIG. 5A showing the drive fluid under drive pressure in the upstream drive chamber of the actuator and showing the piston having moved downstream an axial distance sufficient to seal off the single port from communication with either of the upstream or downstream drive chambers of the actuator.
Figure 5C:
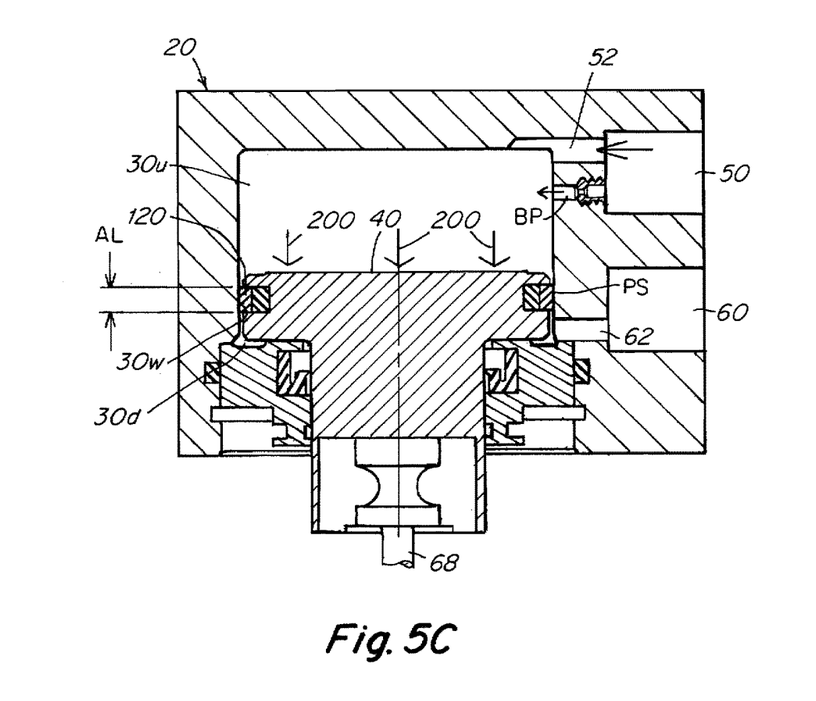
FIG. 5C is a later schematic sequential view relative to FIG. 5B showing the piston of the actuator in its fully downstream position with the bleed valve in communication with only the upstream drive chamber of the actuator.

The fluid seal formed between the outer circumferential seal surface PS and the inner wall surface 30w extends an axial length AL, FIGS. 5A, 5B, 5C in the axial direction A of the chamber 30. As shown in FIGS. 2A, 3A, 4, 5A-5C, a bleed mechanism 54 is disposed within the housing or wall 20h of cylinder 20, the bleed mechanism comprising a single bleed port BP formed in and extending through the interior wall surface 30w at an axial position along the axis A of the chamber 30 that enables the port BP to communicate with both of the chambers 30u and 30d depending on the axial position of the piston 40 within the chamber 30. For example as shown in FIGS. 3A, 4 and 5A, when the piston 40 is disposed in the fully upstream position, the single bleed port BP communicates with the downstream fluid drive chamber 30d and is sealed off from and not in communication with the upstream drive chamber 30u.

When the piston 40 is in the axial position shown in FIG. 5B, the fluid bleed port BP is sealed off completely and does not communicate with either of the chambers 30u or 30d.

Figure 2:
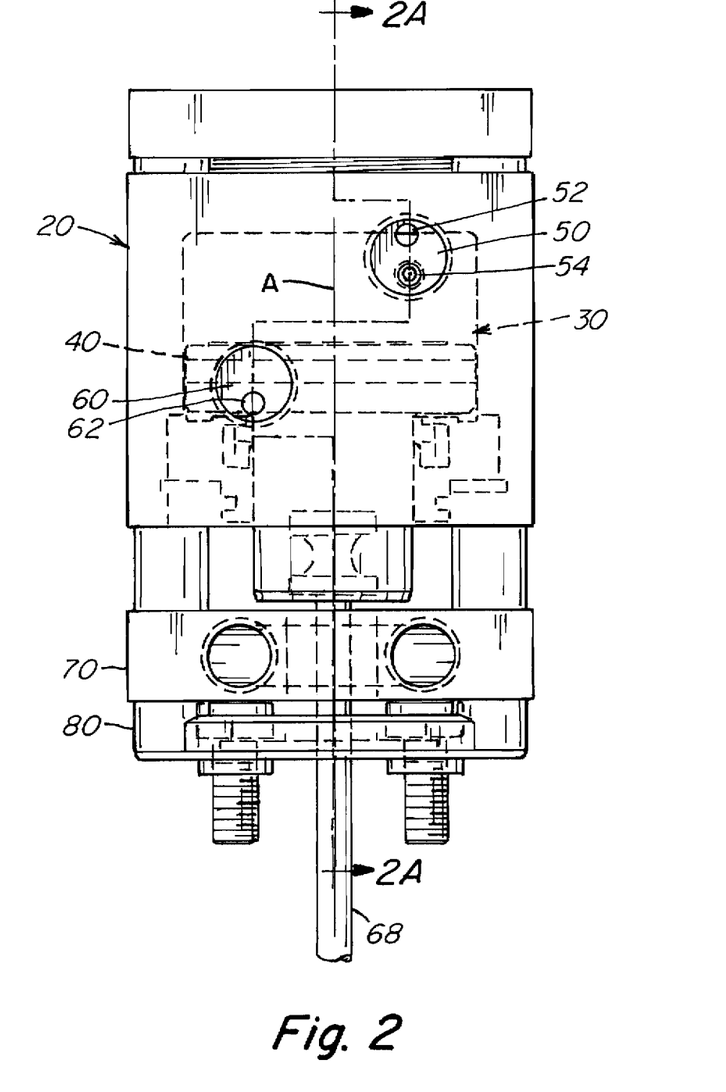
FIG. 2 is a side view of an apparatus according to FIG. 1 where the piston is in the fully downstream position where the valve pin has closed the gate to the cavity of a mold 110.
Figure 2A:
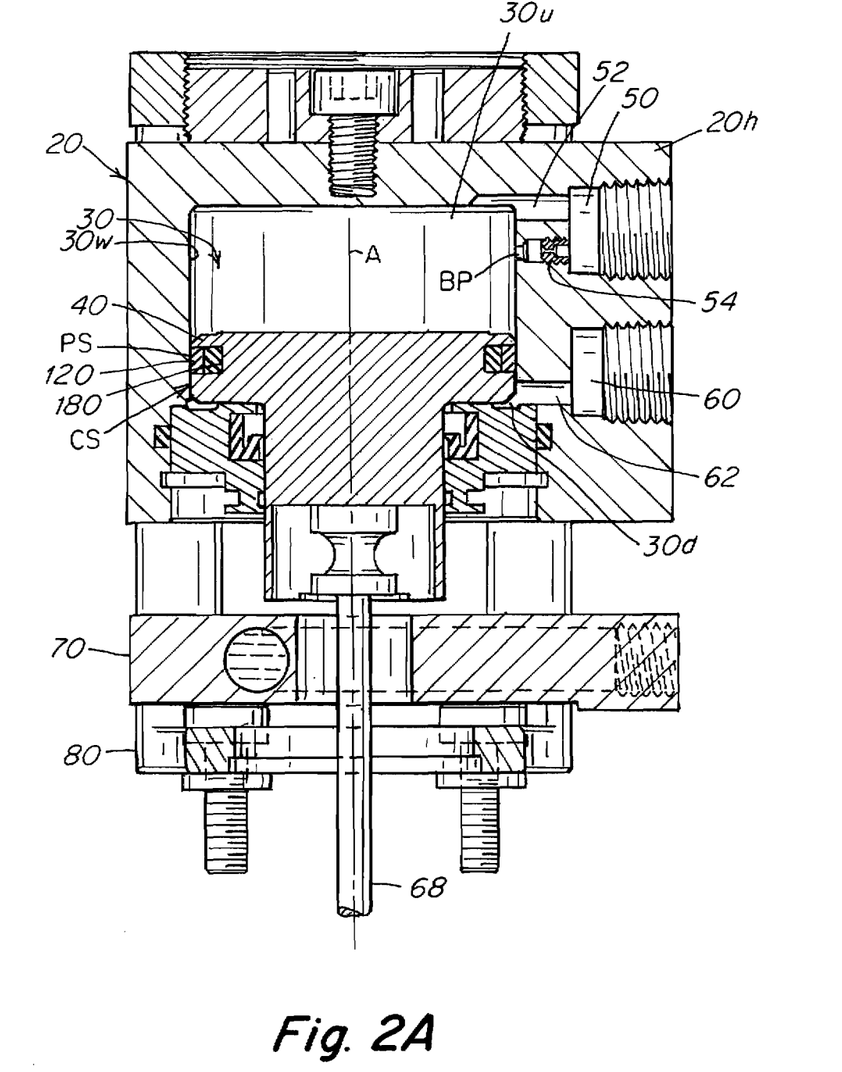
FIG. 2A is cross-sectional view along lines 2A-2A of FIG. 2.

When the piston 40 is in the axial position shown in FIGS. 2A, 5C, the fluid bleed port BP communicates with the downstream drive chamber 30d and not with drive chamber 30u.

As shown by FIGS. 4, 5A, the piston 40, the seal member 120, seal surface PS and the axial position of the bleed port BP along axis A within surface 30w are arranged, configured and preselected so that when the piston 40 travels from a position where it is close to approaching or is in its fully upstream position (where CTA, FIG. 5B, is between about 0 and about 8 mm from the fully upstream position), the bleed port BP is closed off by the seal surface PS of O-ring from communication with pressurized fluid contained within either the upstream chamber 30u or the downstream chamber 30d.

When the piston is driven upstream to an axial position that is close CTA, FIG. 5B, to its fully upstream position, and subsequently driven further upstream to its fully upstream position, FIGS. 5A, 3A, 4, the bleed port BP only then is able to communicate with downstream drive chamber 30d allowing pressurized fluid 150 in the downstream drive chamber 30d to bleed through port BP and then further through the restricted bleed aperture 56.

Figure 8:
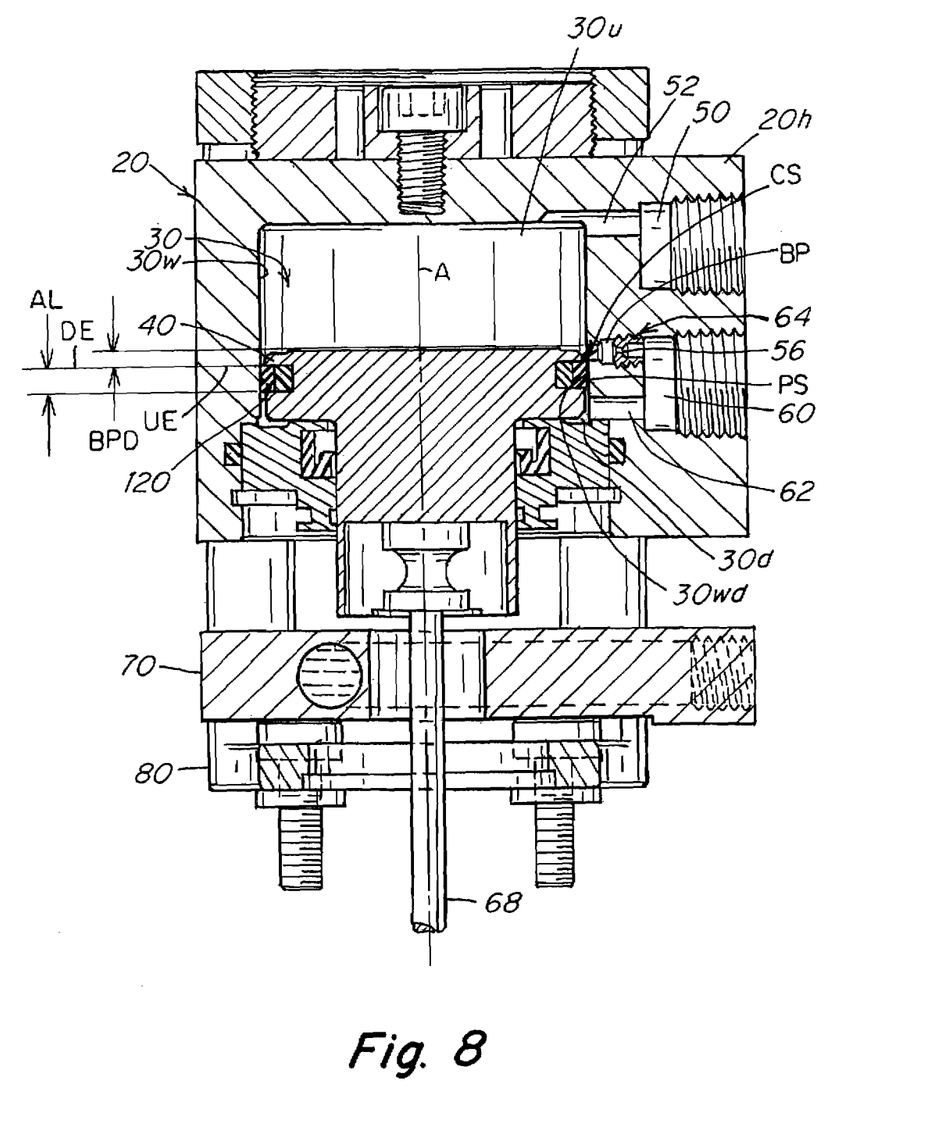
FIG. 8 is a sectional view similar to FIG. 2B showing the bleed port disposed immediately upstream of the piston seal when the piston is disposed in the fully downstream position.

More particularly, the bleed port BP is preferably formed within the housing 20 at an axial position along the axis A of the interior surface 30w of the master chamber 30 that is either disposed immediately downstream of the complementary interior surface 30wu of the master chamber 30 that forms a seal with the circumferential seal surface PS of the O-ring 120 of the piston 40 when the piston 40 is in the fully upstream position as depicted in FIGS. 3A, 4, 5B, or is disposed immediately upstream of the complementary interior surface 30wu of the master chamber 30 that forms a seal with the circumferential seal surface PS of the O-ring 120 of the piston 40 when the piston 40 is in the fully downstream position as depicted in FIG. 8.

Typically the bleed port BP is formed within the housing 20 at an axial position along the axis A of the interior surface 30w of the master chamber 30 such that the axial position of the upstream axial end UE of the bleed port coincides with or overlaps with the axial position of the downstream axial end DE of the seal surface PS when the piston 40 is in the fully upstream position as depicted in FIGS. 3A, 4, 5B.

The axial position of the upstream axial end UE of the bleed port BP can be disposed between 0 and about 8 mm downstream from the axial position of the downstream axial end DE, FIGS. 4, 5E of the seal surface PS when the piston 40 is in the fully upstream position as depicted in FIGS. 3A, 4, 5B.

In an alternative embodiment of the invention as shown in FIG. 8, the bleed port BP and bleed mechanism 64 can be disposed in an axial position that is immediately upstream of the piston seal surface PS when the piston is in the fully downstream position. In such an embodiment, the fluid seal formed between the outer circumferential seal surface PS and an inner wall surface 30wd extends an axial length AL, FIG. 8 along the interior of the chamber 30. As shown in FIG. 8, a bleed mechanism 64 is disposed within the wall 20h of cylinder 20 having a bleed port BP aperture formed within and extending through the interior wall surface 30w at a position along the axis A of the chamber 30 that enables the port BP to communicate with both of the chambers 30u and 30d depending on the axial position of the piston 40 within the chamber 30. For example, when the piston 40 is disposed in the fully upstream position, the bleed port BP communicates with the downstream fluid drive chamber 30d and is sealed off from and not in communication with the upstream drive chamber 30u. Conversely when the piston 40 is in the fully downstream position shown in FIG. 8, the bleed port aperture is in fluid communication with upstream chamber 30u and sealed off from chamber 30d.

Similarly regarding the FIG. 8 embodiment, when the piston 40 is in an axial position analogous to the position shown in FIG. 5B, the fluid bleed port BP is sealed off completely and does not communicate with either of the chambers 30u or 30d.

When the piston 40 is in the axial position shown in FIG. 8 the fluid bleed port BP communicates with the upstream drive chamber 30u and not with the downstream drive chamber 30d.

As shown by FIG. 8, the piston 40, the seal member 120, seal surface PS and the axial position of the bleed port BP and 64 along axis A within surface 30w are arranged, configured and preselected so that when the piston 40 travels from a position where it is close to approaching its fully downstream position (between about 0 and about 8 mm of the fully downstream position), the bleed port BP is closed off by the seal surface PS of O-ring 120 to communication with pressurized fluid contained within either of the chambers 30d or 30u.

When the piston is driven downstream to an axial position that is close to its fully downstream position, if the piston 40 is driven further upstream to its fully downstream position, FIG. 8, the bleed port BP only then is able to communicate with drive chamber 30u allowing pressurized fluid 200 in the upstream drive chamber 30d to travel through circumferential slot CS and then through bleed port BP and then further through the restricted bleed aperture 56.

More particularly in the FIG. 8 embodiment, the bleed port BP is preferably formed within the housing 20 at an axial position along the axis A of the interior surface 30w of the master chamber 30 that is disposed immediately upstream of the complementary interior surface 30wd of the master chamber 30 that forms a seal with the circumferential seal surface PS of the O-ring 120 of the piston 40 when the piston 40 is in the fully downstream position as depicted in FIG. 8.

Typically the bleed port BP, FIG. 8, is formed within the housing 20 at an axial position along the axis A of the interior surface 30w of the master chamber 30 such that the axial position of the downstream axial end DE of the bleed port BP coincides with or overlaps with the axial position of the upstream axial end UE of the seal surface PS when the piston 40 is in the fully downstream position as depicted in FIG. 8.

The axial position of the downstream axial end DE of the bleed port BP can be disposed between about 0 and about 8 mm upstream from the axial position of the upstream axial end UE of the seal surface PS when the piston 40 is in the fully downstream position as depicted in FIG. 8.

The apparatus of the invention can include both an upstream bleed device with bleed port BP disposed in the housing 20h as described with reference to FIGS. 1-5C and a second downstream bleed device with single bleed port disposed in the cylinder housing 20h as described with reference to FIG. 8. In such an embodiment the first bleed device has a single bleed port that is disposed immediately downstream of the complementary interior surface of the master chamber that forms a seal with the circumferential seal surface of the piston and communicates with the downstream fluid drive chamber when the piston is in the fully upstream position and the second bleed device has a second single port that is disposed immediately upstream of another of the complementary interior surfaces of the master chamber that forms a seal with the circumferential seal surface of the piston and communicates with the upstream fluid drive chamber when the piston is in the fully downstream position.

What is claimed is:

1. An apparatus for driving a valve pin in an injection molding system, comprising:
    an actuator comprised of a housing having a fluid sealed master chamber having a longitudinal axis formed within the housing having a piston disposed within the master chamber, the piston having a circumferential surface complementary to an interior surface of the master chamber,
    the piston being slidable upstream and downstream along an axial path of travel within the master chamber wherein a seal surface is disposed on the circumferential surface of the piston that engages against and forms a fluid seal with a selected axial length of the complementary interior surface of the master chamber, the fluid seal forming opposing upstream and downstream fluid drive chambers disposed on opposing upstream and downstream ends of the piston within the master chamber, the path of travel of the piston extending between a fully upstream position and a fully downstream position, wherein upstream and downstream fluid delivery ports are formed within the housing of the actuator, the upstream fluid delivery port communicating with the upstream fluid drive chamber and the downstream port communicating with the downstream fluid drive chamber to reciprocally deliver drive fluid under one or more preselected pressures into the upstream and downstream chambers to reciprocally drive the piston between the fully upstream and downstream positions, a bleed device comprised of a single port extending through the interior surface of the master chamber at an axial position along the longitudinal axis of the master chamber wherein the single port is:

either disposed immediately downstream of the complementary interior surface of the master chamber that forms a seal with the circumferential seal surface of the piston and communicates with the downstream fluid drive chamber when the piston is in the fully upstream position, or is disposed immediately upstream of the complementary interior surface of the master chamber that forms a seal with the circumferential seal surface of the piston and communicates with the upstream fluid drive chamber when the piston is in the fully downstream position.

2. The apparatus of claim 1 wherein the single port extend through the housing at an axial position along the axis of the master chamber such that the single port coincides or overlaps with a downstream axial end of the seal surface when the piston is in the fully upstream position.

3. The apparatus of claim 1 including a second bleed device having a second single port that is disposed immediately upstream or downstream of another of the complementary interior surfaces of the master chamber that forms a seal with the circumferential seal surface of the piston and communicates with another of the upstream or downstream fluid drive chamber when the piston is in another of the fully upstream or downstream positions.

4. The apparatus of claim 1 wherein the axial position of an upstream axial end of the single port is disposed either:

from about 0 to about 8 mm downstream of a downstream axial end of the seal surface when the piston is in the fully upstream position, or from about 0 to about 8 mm upstream of an upstream axial end of the seal surface when the piston is in the fully downstream position.

5. The apparatus of claim 1 wherein the single port is formed so as to extend through the interior wall of the master chamber at an axial position along the path of travel of the piston wherein the single port communicates with the upstream fluid drive chamber and is sealed off from the downstream fluid drive chamber when the piston is disposed within a first selected portion of the path of travel and wherein the single port communicates with the downstream fluid drive chamber and is sealed off from the upstream fluid drive chamber when the piston is disposed within a second selected portion of the path of travel.

6. The apparatus of claim 1 wherein the single port is adapted to enable flow in one direction.

7. The apparatus of claim 1 wherein the single port is adapted to restrict volume of flow of drive fluid through the single port to less than about 25% of volume of flow of drive fluid through the upstream fluid delivery port at the preselected pressure.

8. The apparatus of claim 1 wherein the single port is disposed and extends through the interior wall of the master chamber at an axial position along the axis of the master chamber that enables the single port to either:

communicate with the downstream fluid drive chamber only when the piston is disposed from between about 0 to about 8 mm downstream from the fully upstream position of the piston along the path of travel, or communicate with the upstream fluid drive chamber only when the piston is disposed from between about 0 to about 8 mm upstream from the fully downstream position of the piston along the path of travel.

9. An apparatus for driving a valve pin in an injection molding system, comprising:

an actuator comprised of a housing having a fluid sealed master chamber having a longitudinal axis and being formed within the housing, the actuator including a piston disposed within the master chamber, the piston having a circumferential surface complementary to an interior surface of the master chamber, the piston being slidable upstream and downstream along an axial path of travel within the master chamber wherein a seal surface is disposed on the circumferential surface of the piston that engages against and forms a fluid seal with a selected axial length of the complementary interior surface of the master chamber, the fluid seal forming opposing upstream and downstream fluid drive chambers disposed on opposing upstream and downstream ends of the piston within the master chamber, the path of travel of the piston extending between a fully upstream position and a fully downstream position, wherein upstream and downstream fluid delivery ports are formed within the housing of the actuator, the upstream fluid delivery port communicating with the upstream fluid drive chamber and the downstream port communicating with the downstream fluid drive chamber to reciprocally deliver drive fluid under one or more preselected pressures into the upstream and downstream chambers to reciprocally drive the piston between the fully upstream and downstream positions, a bleed device comprised of a single port formed and disposed within the housing so as to extend through the interior wall at an axial position along the path of travel of the piston wherein the single port communicates with the upstream fluid drive chamber and is sealed off from the downstream fluid drive chamber when the piston is disposed within a first selected portion of the path of travel and wherein the single port communicates with the downstream fluid drive chamber and is sealed off from the upstream fluid drive chamber when the piston is disposed within a second selected portion of the path of travel.

10. The apparatus of claim 9 wherein the single port is formed within the housing at an axial position along the axis of the master chamber such that either:

an upstream axial end of the single port coincides with or overlaps with a downstream axial end of the seal surface when the piston is in the fully upstream position, or, a downstream axial end of the single port coincides with or overlaps with an upstream axial end of the seal surface when the piston is in the fully downstream position.

11. The apparatus of claim 9 wherein the axial position of the single port is disposed either:

such that an upstream axial end of the single port is disposed from about 0 to about 8 mm downstream of a downstream axial end of the seal surface when the piston is in the fully upstream position, or such that a downstream axial end of the single port is disposed from about 0 to about 8 mm upstream of an upstream axial end of the seal surface when the piston is in the fully downstream position.

12. The apparatus of claim 9 wherein the single port is preferably disposed in and extends through the interior surface of the master chamber at an axial position along the axis of the interior surface of the master chamber that is immediately downstream of the complementary interior surface of the master chamber that forms a seal with the circumferential seal surface of the piston when the piston is in the fully upstream position.

13. The apparatus of claim 9 including a second bleed device having a second single port that is disposed immediately upstream or downstream of another of the complementary interior surfaces of the master chamber that forms a seal with the circumferential seal surface of the piston and communicates with another of the upstream or downstream fluid drive chamber when the piston is in another of the fully upstream or downstream positions.

14. The apparatus of claim 9 wherein the single port is adapted to enable flow in one direction.

15. The apparatus of claim 1 wherein the single port is adapted to restrict volume of flow of drive fluid through the single port to less than about 25% of volume of flow of drive fluid through the upstream fluid delivery port at the preselected pressure.

16. The apparatus of claim 9 wherein the single port is disposed in the interior wall of the master chamber at an axial position along the axis of the master chamber that enables the single port to either:

communicate with the downstream fluid drive chamber only when the piston is disposed from between about 0 to about 8 mm downstream from the fully upstream position of the piston along the path of travel, or communicate with the upstream fluid drive chamber only when the piston is disposed from between about 0 to about 8 mm upstream from the fully downstream position of the piston along the path of travel.

17. A method of driving an actuator comprising operating an apparatus as claimed in claim 1.

18. A method of driving an actuator comprising operating an apparatus as claimed in claim 9.

* * * * *

UNITED STATES PATENT AND TRADEMARK OFFICE
CERTIFICATE OF CORRECTION

PATENT NO. : 10,052,801 B2
APPLICATION NO. : 14/933073
DATED : August 21, 2018
INVENTOR(S) : Zhuang Rui Tan and Vito Galati It is certified that error appears in the above-identified patent and that said Letters Patent is hereby corrected as shown below:

In the Claims

Column 11, Line 28 (Claim 2) change "extend" to --extends--.

Column 11, Line 39 (Claim 3) change "chamber" to --chambers--.

Column 13, Line 23 (Claim 13) change "chamber" to --chambers--.

Column 14, Line 3 (Claim 15) change "1" to --9--.

Signed and Sealed this
Thirteenth Day of November, 2018

Andrei Iancu
*Director of the United States Patent and Trademark Office*